United States Patent [19]

White

[11] Patent Number: 5,404,256
[45] Date of Patent: Apr. 4, 1995

[54] TRANSVERSE AND NEGATIVE PRESSURE CONTOUR GAS BEARING SLIDER

[76] Inventor: James W. White, 154 Milmar Way, Los Gatos, Calif. 95032

[21] Appl. No.: 987,508
[22] Filed: Dec. 7, 1992
[51] Int. Cl.6 .......................... G11B 5/60; G11B 17/32
[52] U.S. Cl. .................................................. 360/103
[58] Field of Search ................................. 360/103, 102

[56] References Cited

U.S. PATENT DOCUMENTS

| | | | |
|---|---|---|---|
| 3,855,625 | 12/1974 | Garnier et al. | 360/103 |
| 4,218,715 | 8/1980 | Garnier | 360/103 |
| 4,420,780 | 12/1983 | Deckert | 360/103 |
| 4,475,135 | 10/1984 | Warner et al. | 360/103 |
| 4,636,894 | 1/1987 | Mo | 360/103 |
| 4,673,996 | 6/1987 | White | 360/103 |
| 4,700,248 | 10/1987 | Coughlin et al. | 360/103 |
| 4,734,803 | 3/1988 | Nishihira | 360/103 |
| 4,757,402 | 7/1988 | Mo | 360/103 |
| 4,870,519 | 9/1989 | White | 360/103 |
| 4,961,121 | 10/1990 | Astheimer et al. | 360/103 |
| 5,021,906 | 6/1991 | Chang et al. | 360/103 |
| 5,062,017 | 10/1991 | Strom et al. | 360/103 |
| 5,136,445 | 8/1992 | Zak | 360/103 |
| 5,200,868 | 4/1993 | Chapin et al. | 360/103 |

FOREIGN PATENT DOCUMENTS

| | | |
|---|---|---|
| 55-88234 | 7/1980 | Japan . |
| 55-93427 | 7/1980 | Japan . |
| 57-122063 | 1/1981 | Japan . |
| 57-18171 | 1/1982 | Japan . |
| 57-20962 | 2/1982 | Japan . |
| 57-20963 | 2/1982 | Japan . |
| 59-72679 | 4/1984 | Japan . |
| 60-101781 | 6/1985 | Japan . |
| 60-204878 | 10/1985 | Japan . |
| 63-21271 | 5/1988 | Japan . |

OTHER PUBLICATIONS

White, James W. "The Complexity of Analysis and the Challenge of Air Bearing Design at Flying Heights of Three Microinches," American Society of Mechanical Engineers Winter Annual Mtg., Nov. 10, 1992, Anaheim, Calif.
White, J. W. "An Air Bearing Slider with Uniform Flying Height and Fast Take-Off Characteristics," Tribology and Mechanics of Magnetic Storage Systems, vol. III, pp. 95-101.
Money, J. B. "TPC Technology for Rigid Disk Drives of the 90's & Beyond," Rigid Disk Drive Components Technology Review, Singapore, Mar. 1992.
Prior Art Exhibit "A".
M. Ichinose "Single-Crystal Ferrite Technology for Monolithic Disk Heads," Applied Magnetics Corporation.
J. W. White "Flying Characteristics of the 'Zero-Load' Slider Bearing," Trans. of the ASME vol. 105, Jul. 1983, pp. 484-490.
J. W. White "A Uniform Flying Height Rotary Actuated Air Bearing Slider," IEEE Trans. on Mags., vol. MAG-22, No. 5 Sep. 1986.
J. W. White "The Transverse Pressure Contour Slider: Flying Characteristics and Comparisons with Taper--Flat and Cross-Cut Type Sliders," Adv. Info. Storage Syst., vol. 3, 1991 pp. 1–14.
News Release "Applied Magnetics Corp. Announces Production of Disk Heads Incorporating TPC Air Bearing Surfaces," Applied Magnetics Corporation, Sep. 1, 1992.
J. W. White "Flying Characteristics of the 3370-type Slider on a 5 1/4-Inch Disk-Part 1:Static Analysis ©" Univ. of Tenn. -

Primary Examiner—A. J. Heinz
Assistant Examiner—Kevin M. Watkins
Attorney, Agent, or Firm—Townsend and Townsend Khourie and Crew

[57] ABSTRACT

The invention provides a magnetic head slider with uniform and controllable flying height through a range of skew angles. According to the invention, a transverse and negative pressure contour (TNP) slider comprises a support structure which carries at least two TPC type pads, each having a transverse pressurization contour along at least one side edge of its face, at least one NP type pad provided with a bearing face and a recess which develops a subambient pressure level, and an ambient pressure reservoir separating each TPC type pad from each NP type pad for preventing hydrodynamic interaction between the pads. The ambient pressure reservoir defines a cavity having a depth with respect to the face of each TPC pad sufficient to maintain substantially ambient pressure in the cavity during movement of the recording medium.

38 Claims, 10 Drawing Sheets

PRIOR ART

PRIOR ART

PRIOR ART

TRANSVERSE AND NEGATIVE PRESSURE CONTOUR GAS BEARING SLIDER

BACKGROUND OF THE INVENTION

The present invention relates generally to magnetic disk drives, and more specifically to magnetic head sliders for positioning a magnetic transducer over a hard disk surface.

The typical magnetic head slider of current hard disk drive products utilizes two or more coplanar rails or pads for the load developing surface, together with a compression inlet (such as a taper or step) on at least two of the rails for maintaining a positive pitch attitude between slider and disk surface. An external load force is applied to the slider (toward the disk). The gas film pressurization between head and disk balances the external force at some clearance between head and disk. This clearance is called the "flying height" or "fly ht." Of particular interest is the fly ht. at the magnetic recording gap which is usually located near the slider trailing edge in one of the rails. In order to maximize the amount of data stored on a disk surface, it is desired to fly at a constant fly ht. across the disk recording surface. Conventional taper-flat sliders which are currently used in most disk drive products do not fly at a constant height over the recording surface due to the air bearing characteristics of that geometry.

The trend is toward smaller, more portable applications for data storage products. This results in smaller disk drives. The recording head is typically positioned over the recording area of the disk by a rotary actuator. The varying angular orientation of the slider longitudinal axis relative to the disk motion due to the rotary actuator causes the fly ht. and slider roll angle to vary over the recording surface. This angular orientation is referred to as the "skew angle." The skew angle is typically defined to be negative when the slider leading edge is rotated out, away from the disk center. Most disk drives operate in such a way that the sliders start and stop in contact with the disk surface. The relative motion between slider and disk at start-up produces the self-acting gas bearing effect which causes the slider to lift-off and proceed to the fully flying orientation. Intermittent contact occurs between slider and disk as rotation starts until a stable gas bearing is developed. The amount of contact and wear that occurs between slider and disk during rotational start-up depends on the magnitude of load force and how rapidly the gas bearing is developed.

The slider load force that is used in most disk drive products today varies between about 4 and 10 grams. There is, however, a trend toward lower load forces. The increased data densities of new products require a thinner magnetic layer on the disk surface as well as a thinner protective overcoat on top of the magnetic layer. In order to minimize the wear that occurs at the slider/disk interface, there is an increased emphasis on decreasing the average contact pressure between slider and disk. The average gas film pressure may be given by $P=F/A$, where "F" is the externally applied force and "A" is the total gas bearing surface area of the slider. It is seen that the external force may be decreased and/or the slider gas bearing surface area can be increased in order to decrease the average gas film pressure. Note that this average gas film pressure is also the average contact pressure when the disk is stationary, assuming the entire slider gas bearing surface area is in contact.

As recording densities increase, the gas bearing fly ht. decreases. Current high performance products fly at about 4 microinches and the general trend is toward ever lower values of flying height. In order to develop lower fly ht., the slider rail width or pad width is typically decreased (with the external force held constant). This results in a decreased gas bearing surface area. Another approach is to increase the external force while keeping the slider rail width constant. Note that both of these approaches produce an increase in both the average gas film pressure and the average contact pressure between slider and disk. A list of desirable slider air bearing characteristics for the head/disk interface of near-term hard disk drives is given below:

(1) Low, constant fly ht. over the data band, with very little slider roll
(2) Low slider load force (for decreased wear)
(3) Rapid slider take-off during rotational start-up
(4) High gas bearing stiffness (for increased flying height stability and control)
(5) High gas bearing damping (for increased stability and minimum settling time after access motion)
(6) Acceptable flying characteristics with large skew angle variations over the data band (Large skew angle variations are important in order to increase the width of the data band for increased storage, or to decrease the rotary arm size and inertia for decreased energy requirements during access motion).

Different slider geometry types have different gas bearing characteristics. The taper-flat (TF) type slider utilizes 2 or more rails for developing a positive load. The fly ht. of the TF slider is quite sensitive to the skew angles produced by a rotary actuator. This type slider is relatively simple to manufacture and is utilized in most disk drive products today. The TF slider is described in U.S. Pat. No. 3,823,416 to Warner, the complete disclosure of which is incorporated herein by reference.

A negative pressure (NP) type slider utilizes the positive load developed by longitudinal rails and the negative (subambient) load developed by a recess to provide a net low load. This results in the low net load (adjustable to any value), high gas bearing stiffness, and rapid slider take-off. The conventional NP slider has poor damping characteristics, and provides a flying height and roll angle that is sensitive to skew angle.

Figure 1A:
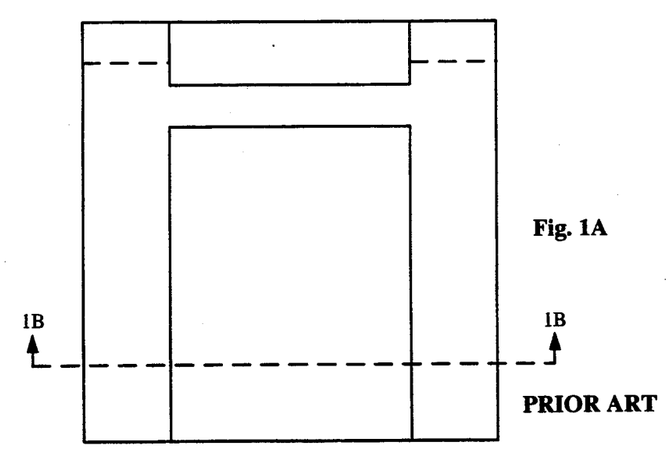
FIGS. 1A and 1B are top and front elevational views, respectively, of a NP slider according to the prior art.
Figure 1B:
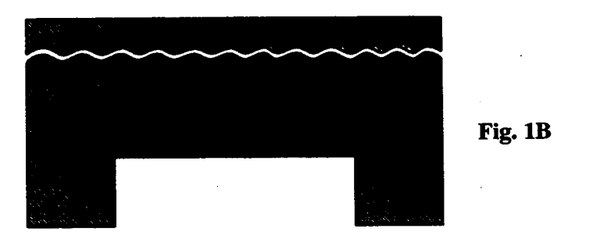
Figure 2:
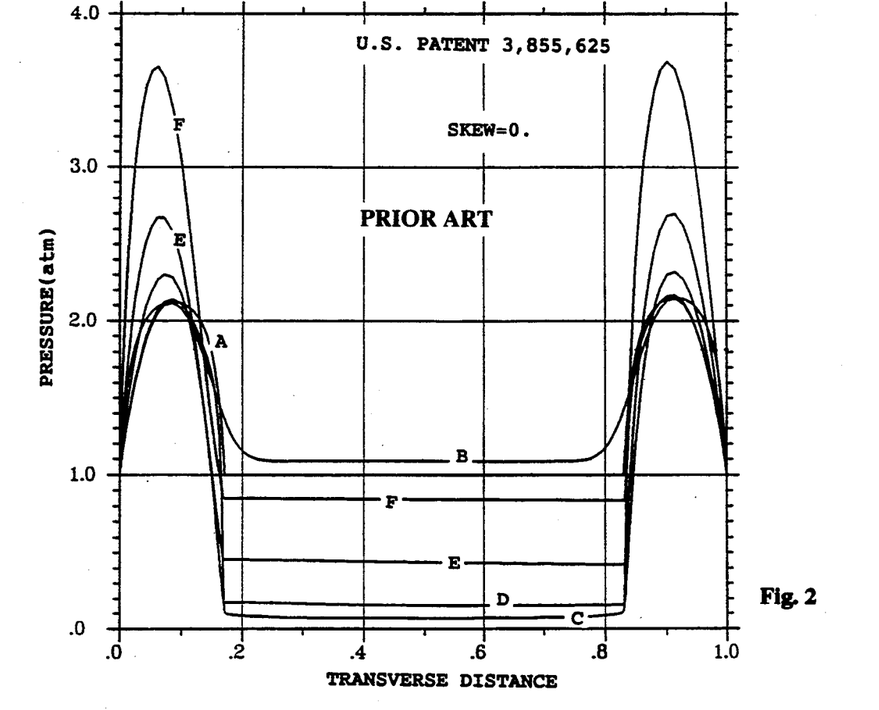
FIG. 2 is a graph of gas pressure as a function of position along the NP slider of FIGS. 1A and 1B at a zero skew angle.

In our U.S. Pat. No. 3,855,625 ('625), the complete disclosure of which is incorporated herein by reference, an NP slider, illustrated in FIGS. 1A and 1B is disclosed. The intended application was with a zero skew angle (linear actuator). In such a case, the changing disk velocity with radius has an influence on the positive load developed by the rails which is about in the same proportion to that for the negative load produced by the recess. This results in a near constant flying height over the data band when the skew angle is maintained at near zero. Pressure profiles over the NP slider at zero skew are shown in FIG. 2 and are seen to be nearly symmetric about the slider longitudinal centerline. These and other pressure profiles which will be described later are based on simulations done with a computer code named BOLTZMANN1, which I authored. In these figures, curves A–F represent pressure levels in the transverse direction at various distances from the leading edge of the slider, with curve A at 9% of the slider length, curve B at 36% of the slider length, curve C at 40% of the slider length, curve D at 58% of the slider length, curve E at 76% of the slider length and curve F at 94% of the slider length from the leading edge. These simulations were made on a "70%" size slider which flies on an air film over a 3.5 inch disk spinning at 5400 rpm.)

Figure 3:
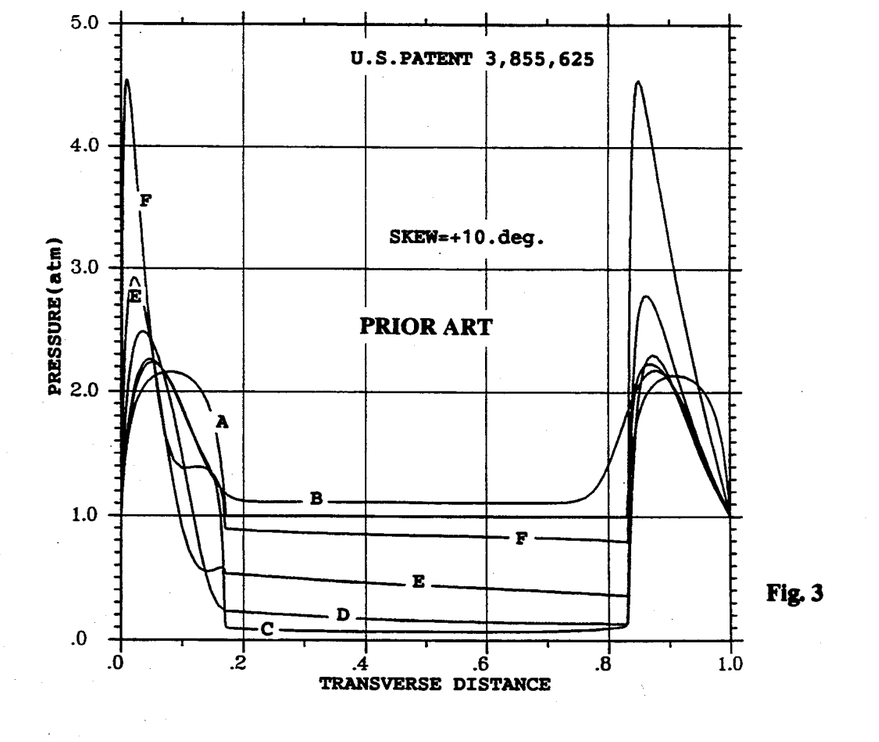
FIG. 3 is a graph of pressure as a function of position along the NP slider of FIGS. 1A and 1B at a skew angle of +10°.

When this NP slider is used with a rotary actuator, however, the skew motion across the slider causes the low subambient pressure of the recess in a conventional NP slider to be convected over the positive pressure rails. This causes extreme pressure distortion over the rails and causes the slider fly ht. and roll angle to vary unacceptably over the data band. Pressure profiles for the NP slider are shown in FIG. 3 for the case of +10° skew. In this case, the transverse motion due to skew is from right to left on the figure. It may be noted that the subambient pressure of the recess is convected over the left side pad. Other NP type sliders are described in U.S. Pat. No. 4,218,715; U.S. Pat. No. 4,475,135; U.S. Pat. No. 4,420,780 and U.S. Pat. No. 5,062,017, which are incorporated herein by reference. Sliders of each of these patents suffer from flying height sensitivity to skew angle.

Since the NP slider depends on a combination of positive and negative load to provide the net low positive load, the positive pads are wider than those of a conventional TF slider. The increased stiffness of the NP slider is achieved by the larger positive load of the longitudinal rails. The subambient load of the recess has little influence on the overall slider gas bearing stiffness. The increased stiffness of the NP slider contributes to a faster take-off during start-up, and the low net load and wider pads produce a reduced average gas film and contact pressure.

Figure 4A:
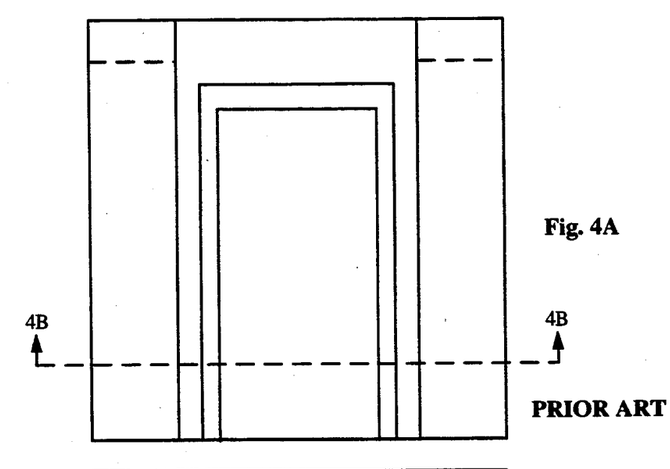
FIGS. 4A and 4B are top and front elevational views, respectively, of another NP slider according to the prior art.
Figure 4B:
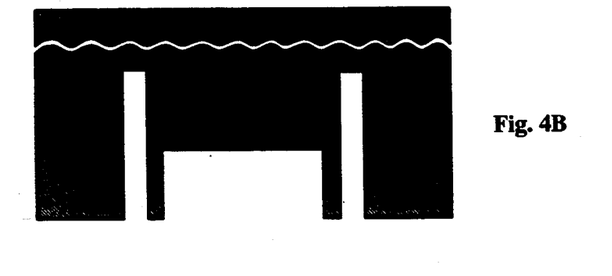
Figure 5:
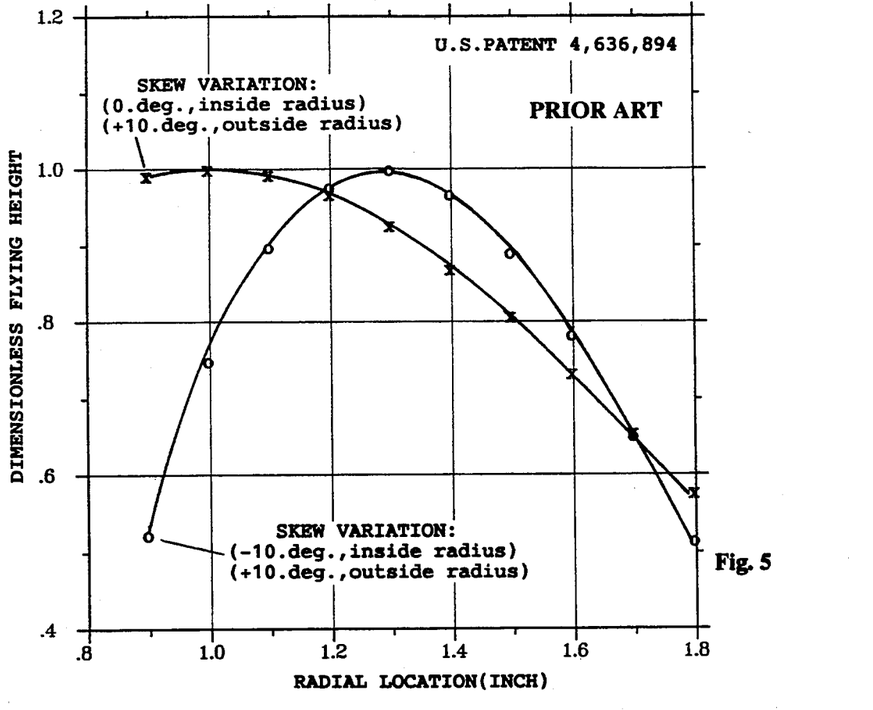
FIG. 5 is a graph of flying height as a function of radial location on the recording medium for the NP slider of FIGS. 4A and 4B.

The side boundaries of the recess of the NP slider in our '625 patent are formed by the side edges of the outside rails. In U.S. Pat. No. 4,636,894 ('894), which is incorporated herein by reference, Mo describes the possible problem of controlling the side boundaries of the recess (and thus, the rail width) when using an etching process to form the recess. In '894 (see FIGS. 4A and 4B), Mo suggests the use of a groove and buffer pad to separate the side edges of the recess and rails so as to reduce the sensitivity of the resulting rail widths to the etching process used. The resulting NP slider of the '894 patent has a large flying height sensitivity to skew angle which is similar to that of the TF slider. This flying height sensitivity to skew angle of the '894 patent NP slider is caused by pressure distortion and dilution over the outer rails as flow enters the gas bearing across the rail side edges. Flying height profiles for an NP slider possessing the '894 patent configuration are given in FIG. 5. Two skew distributions, (−10°,+10°) and (0,+10°), are presented. In both cases, there is a wide variation of flying height over the recording zone of the disk.

A further slider type is the TPC slider described in my U.S. Pat. Nos. 4,673,996 ('996) and 4,870,519 ('519), which are incorporated herein by reference. Each slider rail utilizes a transverse pressure contour (TPC) on at least one side edge. The result is that the gas bearing effect of the changing velocity over the data band is almost exactly offset by that of the changing skew angle, producing a constant flying height and nearly zero roll angle.

Figure 6A:
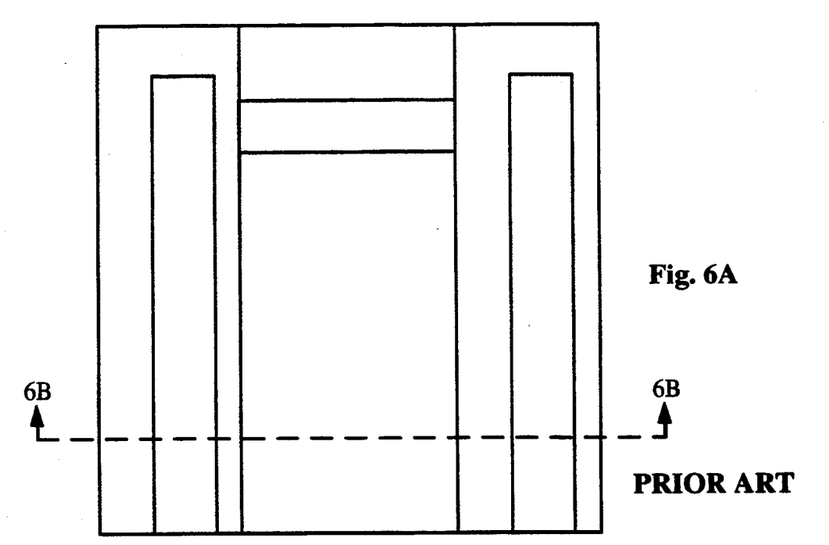
FIGS. 6A and 6B are top and front elevational views, respectively, of a TPC slider having an NP recess according to the prior art.
Figure 6B:
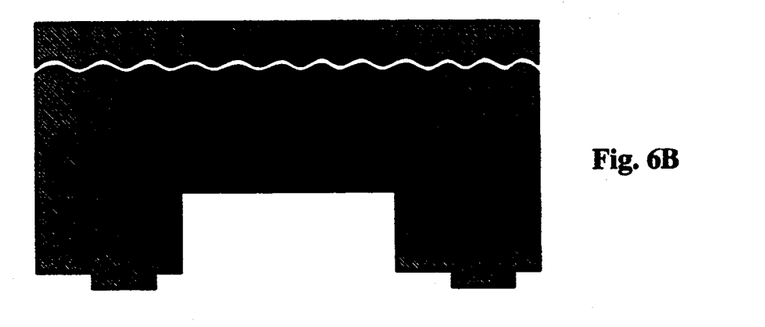

A combination TPC/NP type slider was also described in '996 and '519, illustrated in FIGS. 6A and 6B. In both TPC patents, the negative pressure recess side boundaries were formed by the slider outer rails and the rails were connected by a cross bar. An objective of the present invention is to provide a new combination low load TPC/NP type slider with even more rapid take-off and with the ability to negotiate even wider skew angle variations with constant flying height.

SUMMARY OF THE INVENTION

The invention provides a transverse and negative pressure contour (TNP) slider which combines the features of an NP slider with a TPC slider in such a way as to achieve substantially constant flying height over a wide range of skew angles and very fast take-off.

In a preferred embodiment, the invention provides a slider assembly comprising a support structure which carries at least two TPC type pads, each having a transverse pressurization contour along at least one side edge of its face, at least one NP type pad provided with an air bearing face and a recess which develops a subambient pressure level, and an ambient pressure reservoir separating each TPC type pad from each NP type pad for preventing hydrodynamic interaction between the pads. The ambient pressure reservoir defines a cavity having a depth with respect to the face of each TPC pad sufficient to maintain substantially ambient pressure in the cavity during movement of the recording medium. Usually, the ambient pressure reservoir will have a non-tapered leading edge.

The TPC type pads will define a face toward the recording medium and a converging inlet at the leading edge for pressurizing gas between the face and the recording medium. The transverse pressure contour (TPC) will be disposed along at least one side edge of the face, and in an exemplary embodiment, will be disposed along both side edges of the face. The faces of the TPC type pads are not necessarily rectangular in shape. In the transverse direction, the TPC geometry may be a step, taper, or convex shape. Regardless of the shape, at each location along the side edge which contains the TPC, an average angle may be defined by $$\theta = \tan^{-1}\left(\frac{\text{depth}}{\text{width}}\right) < 5.°$$

where
  depth = the total depth of the TPC at the given location
  width = the width of the TPC at the given location
The width of the TPC is not necessarily constant, but may vary along the side edge. The side edges of the faces may be non-parallel, and, for example, may diverge from one another from the leading edge toward the trailing edge. The TPC may extend the full length of the side edge on which it is located, or along only a selected portion thereof.

The recess in the NP type pad will usually be open at its trailing edge. The NP type pad is not necessarily rectangular. The recess depth is preferably less than 25 microns, so as to develop a subambient pressure level that serves to attract the slider assembly toward the recording medium during movement thereof. The side edges of the NP type pad may or may not contain TPC sections for additional flying height control.

The TPC type pads and NP type pads may be arranged in a variety of configurations on the support structure. In an exemplary embodiment, two TPC type pads are provided along each side of the support structure extending from the leading edge to the trailing edge. In a further embodiment, a TPC type pad is disposed at each leading edge corner of the support structure, and a third TPC type pad is disposed along the trailing edge, usually near the center, of the support structure. In another embodiment, a TPC type pad is located at both trailing edge corners. A relatively flat pad may further be provided for housing the magnetic transducer, which, in an exemplary embodiment, is disposed centrally along the trailing edge of the support structure.

A further understanding of the nature and advantages of the invention may be realized by reference to the remaining portions of the specification and the drawings.

DESCRIPTION OF SPECIFIC EMBODIMENTS

The composite TPC/NP slider, hereafter referred to as the TNP (Transverse and Negative Pressure contour) slider, is defined by a combination of "TPC type" gas bearing pads or rails and at least one "NP type" pad situated on a magnetic head slider platform. Each of the pads or rails is separated from the others by an ambient pressure reservoir. The ambient pressure reservoir is composed of a relatively thick gas film which is continually fed with ambient pressure gas by the convection due to relative motion between slider and disk. The ambient pressure reservoir completely borders each pad and prevents direct hydrodynamic interaction between any of the pads. That is, hydrodynamic pressure generated over one pad cannot be convected over any other pad. This tends to minimize pressure distortion over the slider and contributes to flying height control.

Figure 7A:
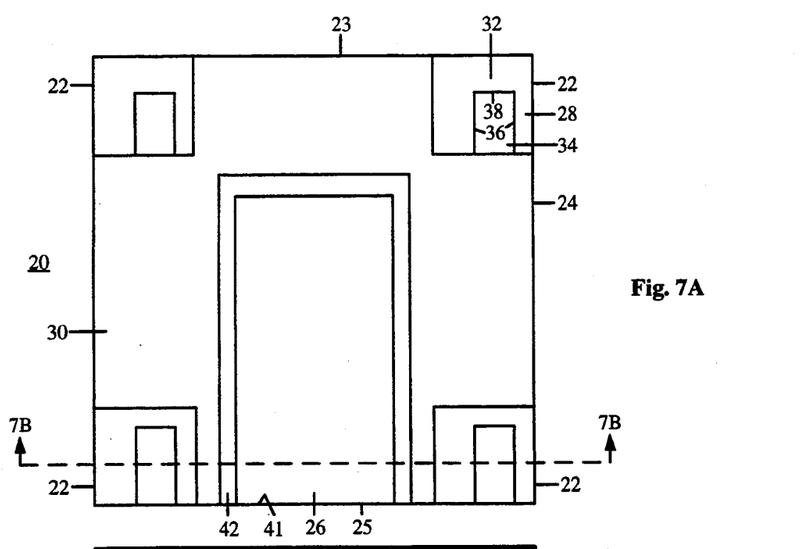
FIGS. 7A and 7B are top and front elevational views, respectively, of a specific embodiment of a TNP slider constructed in accordance with the principles of the present invention.
Figure 7B:
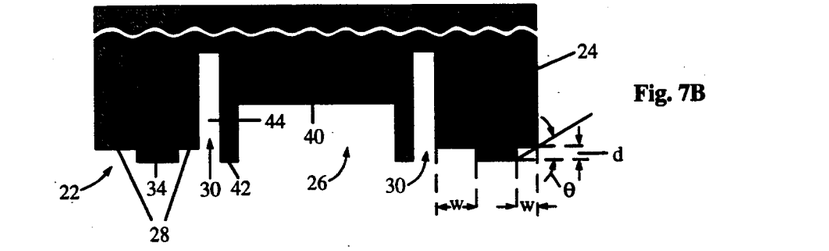

One version of the TNP slider 20 is shown in FIGS. 7A and 7B. In this example, there are four TPC pads 22, one at each of the corners of the slider platform 24, and one central NP pad 26. Slider platform 24 has a leading edge 23 and a trailing edge 25. The four TPC pads tend to maximize the gas bearing pitch and roll stiffness. In addition, they tend to allow (because of their less slender width to length ratio as compared to full slider length rails) a wider range of skew angle variations while maintaining a constant flying height and near zero roll angle. This increased flying height control is due in part to the fact that with the relatively wider TPC pads, the varying skew angle has less influence on the air bearing pressure generated. The compression inlet of each TPC pad includes a converging portion at a leading edge, shown as a stepped surface in FIG. 7A. Each TPC pad could also function in an equivalent manner with a tapered inlet or with a convex shaped inlet. The same is true of other embodiments of the TNP slider described herein.

Increased flying height control also results from the fact that the TPC contours 28 are multi-function load generators (compression or expansion), depending on the skew angle magnitude and direction. For a given disk size and skew angle distribution, the TPC width and depth parameters may be sized to provide the precise amount of lift or vacuum effect required as radial location and skew angle varies, in order to produce the desired flying height profile. The presence of compression inlets on the two trailing pads (as well as the two leading edge pads) causes the full slider length to be lifted when disk rotation starts. This causes the full slider length to establish a non-contact flying attitude at a lower disk velocity than a full rail length TF or TPC type slider.

The NP pad 26 produces a negative lift to the slider and allows the net slider load to be specified at a low value. This results in the TPC pads being oversized and producing more positive lifting force than for the case without the NP pad. When the TNP slider starts in contact with the disk, the first disk motion generates hydrodynamic pressure effects primarily on the TPC pads, because the load carrying surface of the NP pad is considerably elevated from the disk surface. The gas bearing load generated at low disk velocity over the four oversized TPC pads causes the slider to separate quickly from the disk surface. The vacuum effects produced by the NP pad develop at higher velocities after the slider is flying.

The ambient pressure reservoir 30 serves to isolate the load generating effects of the various pads. The reason for this becomes clear when considering the combined TPC/NP type slider described in my '996 and '519 patents. In that case, the side boundaries of the NP pad are formed by the TPC rails. When a large skew angle is utilized, the low pressure of the recess is convected over one of the rails, causing pressure distortion over that rail. This results in some flying height and roll angle sensitivity to skew. In the present invention, the ambient pressure reservoir 30 prevents direct hydrodynamic interaction between the various load generating pads. Larger skew angles than are possible with the conventional TPC and TPC/NP sliders are possible with the new TNP slider. This is due to the use of reduced slenderness ratio oversized TPC pads, and to the load reducing effect of the NP pad 26. Diagonal convection produced by skew cannot penetrate as far into the oversized pads. A quicker slider take-off is due to compression inlets 32 on all four TPC pads and to the oversized (stiffer) TPC pads 22 made possible by the NP pad 26. Thus, each gas bearing pad plays a key role in providing for a faster take-off from the disk surface and in allowing a wider range of skew angles.

In the embodiment of FIGS. 7A and 7B, each TPC pad 22 is defined by a face 34 for creating a gas bearing effect, a TPC section 28 comprising a constant depth step bearing along the side edges 36 of the face 34 and a constant depth step along the leading edge 38 forming a converging compression inlet 32. Thus, the gas bearing contour of the TPC pad 22 is defined by two parallel planes with a slight off-set. The faces 34 and TPC sections 28 of TPC pads 22 may or may not be rectangular. The TPC edge contours 28 may or may not run the full length of the TPC pad 22, and the width of the TPC sections 28 may vary along the pad length for increased flying height control. The TPC sections 28 and compression inlet 32 of the TPC pad 22 may be defined by either step, taper, or convex geometries, or by combinations of these geometries. The edge contours 28 of the TPC pad 22 and compression inlet are such that the average angle Θ, defined by the depth d of the TPC 28 or compression inlet 32 and the width w of the TPC 28 or compression inlet 32, is given by $$\theta = \tan^{-1}\left(\frac{\text{depth}}{\text{width}}\right) < 5.°$$

The NP pad 26 is defined by a substantially plane surface which contains a recess 40 open at the trailing end 25. The NP pad 26 may further include one or more bearing faces 42 at a height approximately that of the faces 34 of the TPC pads 22 for creating a gas bearing effect. Recess 40 will be open along its trailing edge 41; that is, trailing edge 41 will have a configuration and height relative to ambient pressure reservoir 30 such that the pressure along trailing edge 41 is substantially ambient. Thus, bearing face 42 will not extend across trailing edge 41 of the NP pad. The recess 40 of the NP pad 26 will preferably have a depth of less than about 25 microns relative to the bearing faces 42 so as to generate subambient pressure in response to movement of the disk relative to the slider. The NP pad 26 may or may not be rectangular in shape.

The ambient pressure reservoir 30 will define a cavity 44 having a depth and configuration sufficient to maintain substantially ambient pressure in the cavity during movement of the disk. This depth will preferably be at least about two microns relative to the faces 34 of the TPC pad 22. Further, ambient pressure reservoir 30 will in most cases have a non-tapered (non-stepped, non-convex) inlet along leading edge 23 so as to inhibit generation of gas bearing effects created by compression of inlet gas. In most cases, the ambient pressure reservoir will have a substantially constant depth throughout cavity 44 from leading edge 23 to trailing edge 25. The ambient pressure reservoir is continually replenished with ambient pressure gas due to the viscous convection caused by disk rotation.

In some applications, it may be desirable to utilize a slider 20 without TPC contours 28 on some or all of TPC pads 22. In such a case, faces 34 would occupy the entirety of TPC pads 22, with side edges 36 bordering ambient pressure reservoir 30. Compression inlet 32 would remain at leading edge 38 of each pad to provide compression of gas between faces 34 and the disk.

Figure 8:
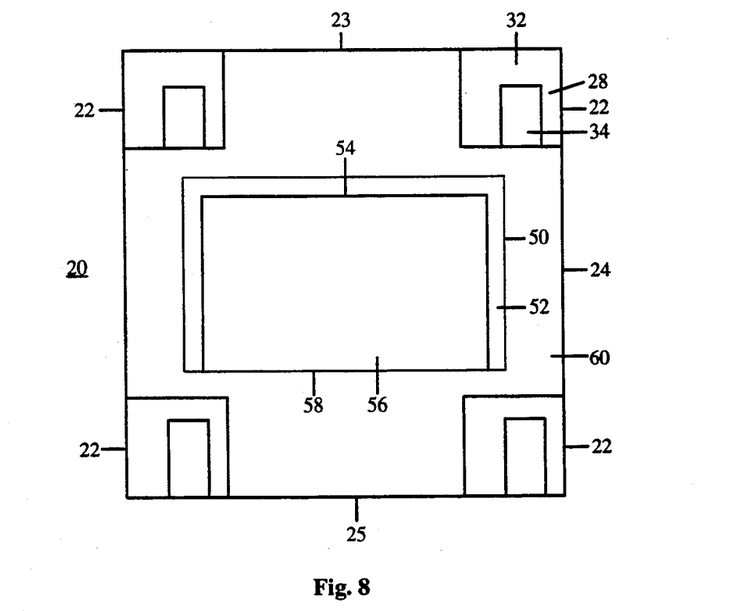
FIGS. 8-10 are top elevational views of further specific embodiments of a TNP slider constructed in accordance with the principles of the present invention.

Other configurations of the TNP slider 20 are possible. A further exemplary embodiment is presented in FIG. 8, and includes an NP pad 50 that does not extend to the slider trailing edge 25. Bearing face 52 surrounds only the leading edge 54 and two sides of NP pad 50. Recess 56 is bounded at its trailing edge 58 by ambient pressure reservoir 60. This arrangement reduces the width of the gas bearing surface at the slider trailing edge which is exposed to the minimum fly ht. Thus, this arrangement reduces the exposure to intermittent contact between slider and disk.

Figure 9:
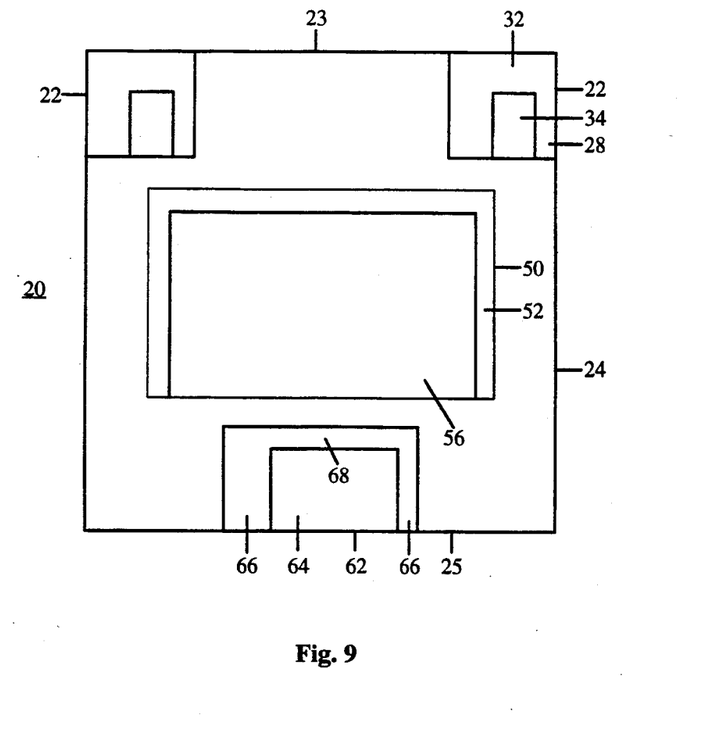

FIG. 9 illustrates a slider with a single centered TPC pad 62 along trailing edge 25 of slider 20. TPC pad 62 defines a face 64 with TPC contours 66 and leading edge compression inlet 68. The motivation here is that the gap (transducer) located in the trailing pad 62 will have a fly ht. that is less sensitive to tolerances that cause the slider 20 to roll.

Figure 10:
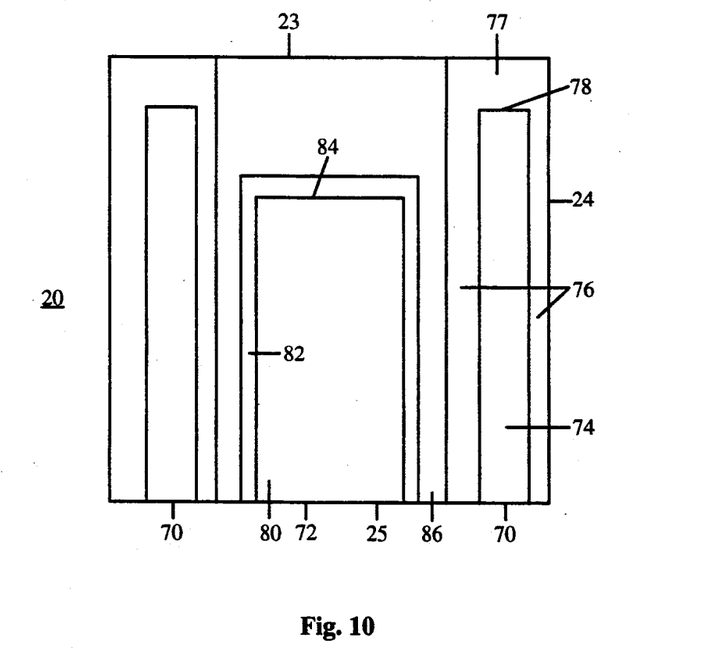

FIG. 10 illustrates a slider geometry that utilizes two full length TPC rails 70 along opposing sides of the slider platform 24 and a central NP pad 72 between the TPC rafts 70. TPC rafts 70 each define a face 74 having TPC contours 76 along its side edges and compression inlet 77 along its leading edge 78. NP pad 72 defines a recess 80 open along trailing edge 25 and surrounded by a bearing face 82 along both sides and leading edge 84. Ambient pressure reservoir 86 separates rails 70 from NP pad 72.

Figure 11:
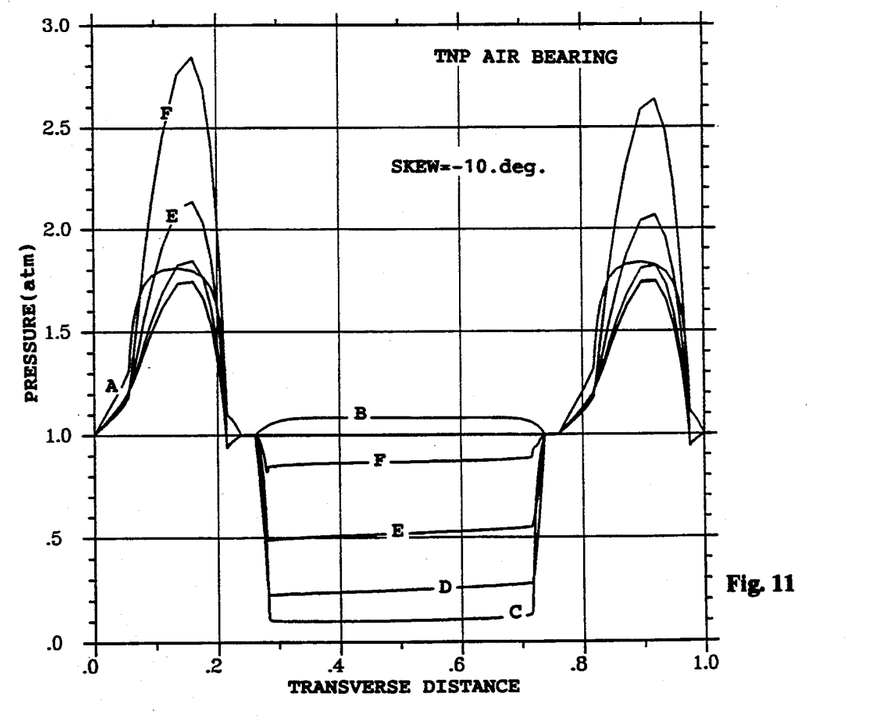
FIGS. 11-13 are graphs of gas pressure as a function of transverse position on the TNP slider of FIG. 10 for skew angles of −10°, 0 and +10°, respectively.
Figure 12:
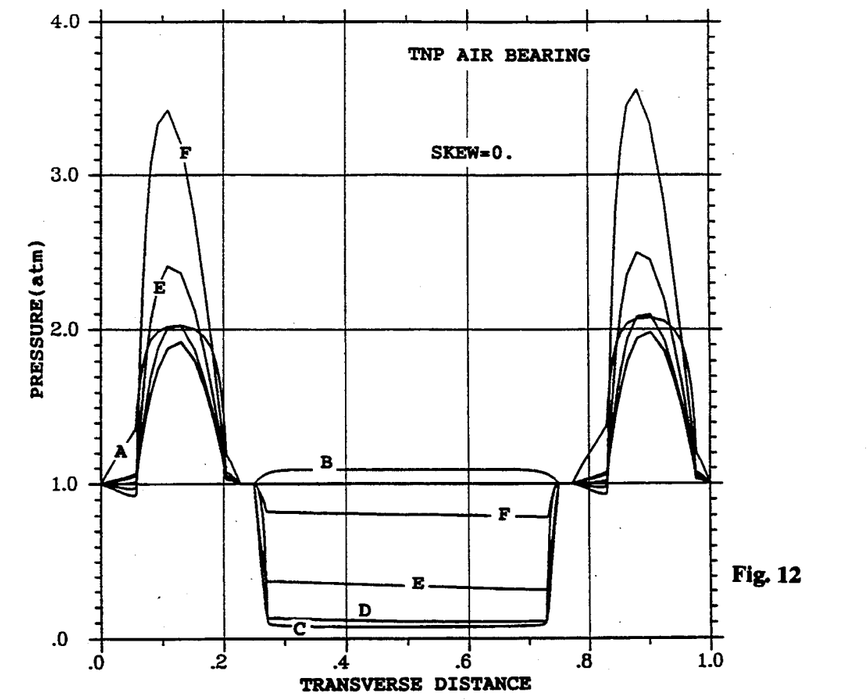
Figure 13:
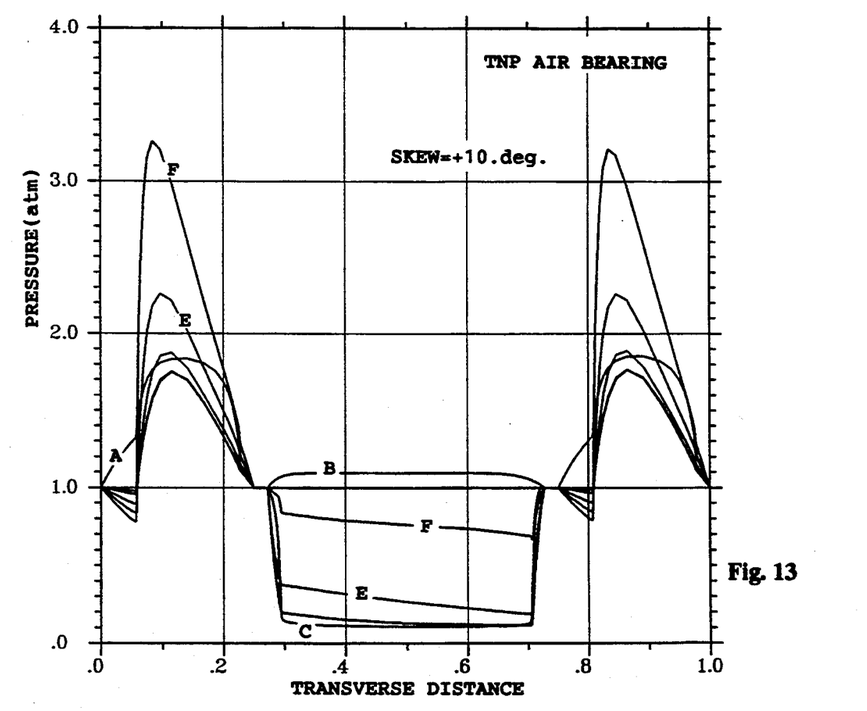

Pressure profiles corresponding to the slider type shown in FIG. 10 are presented on FIGS. 11–13, for skew angles of −10° (transverse motion from left to right), zero skew, and +10° (transverse motion from right to left), respectively. As described above, in these figures, curves A–F represent pressure levels in the transverse direction at various distances from the leading edge 23 of slider 20, with curve A at 9% of the slider length, curve B at 36% of the slider length, curve C at 40% of the slider length, curve D at 58% of the slider length, curve E at 76% of the slider length and curve F at 94% of the slider length from leading edge 23. In the embodiment of FIG. 10, curve A corresponds to the location of leading edge 78 of face 74 on TPC rails 70 where compression inlet 77 meets face 74. Curve C corresponds to the location of the leading edge of the recess 80. For purposes of reference, leading edge portion 84 of bearing face 82 of NP pad 72 lies at 27% of the length of slider 20 from leading edge 23. It should be noted that there is a relative lack of pressure distortion due to skew.

Figure 14:
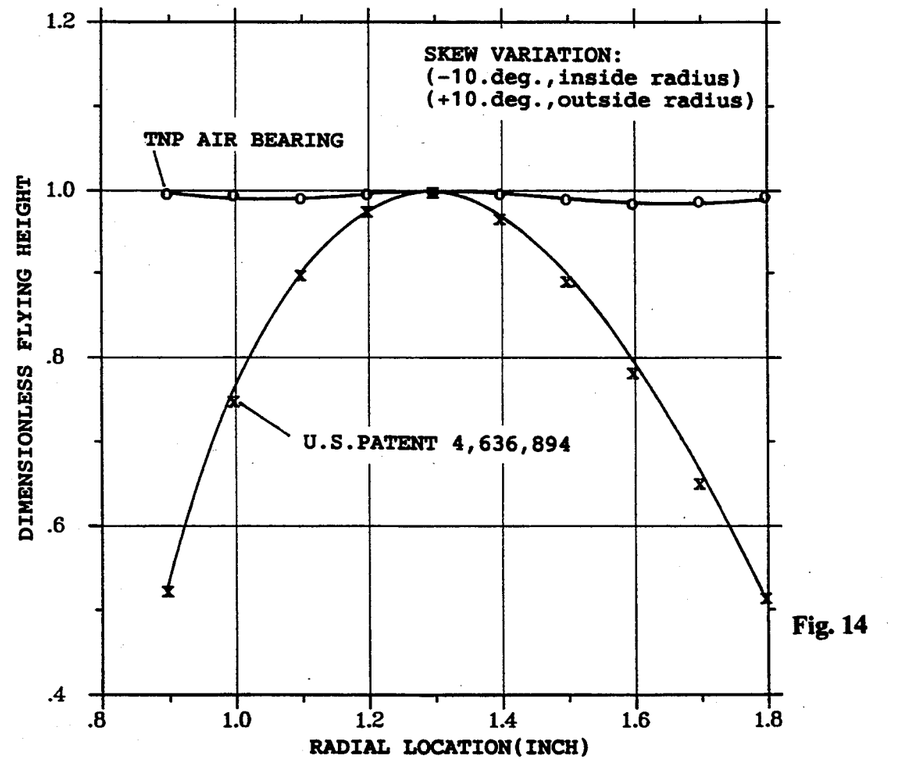
FIG. 14 is a graph of flying height as a function of radial position on the recording medium for the TNP slider of FIG. 10 as compared with the NP slider of FIGS. 4A and 4B.

The flying height profile for a TNP slider 20 of the geometry in FIG. 10 is presented in FIG. 14. The slider geometry is based on a 70% scale slider and the disk speed is 5400 rpm. In this example, the TPC sections 28 have a step depth of 25μ-inch and the NP pad recess is 150μ-inch deep. The flying height shown on FIG. 14 for the TNP slider is due to a skew angle variation of from −10° at the inside data track to +10° at the outside radius data track. The flying height of the TNP slider is seen to be nearly constant over the radial recording band. Also shown for comparison is the flying height profile for the slider of the '894 patent illustrated in FIGS. 4A–4B and graphically presented in FIG. 5. Both slider configurations are subject to the same skew angle distributions. While the flying height of the slider of the '894 patent varies widely over the data band, the flying height of the TNP slider varies by only 0.1μ-inch.

Figure 15:
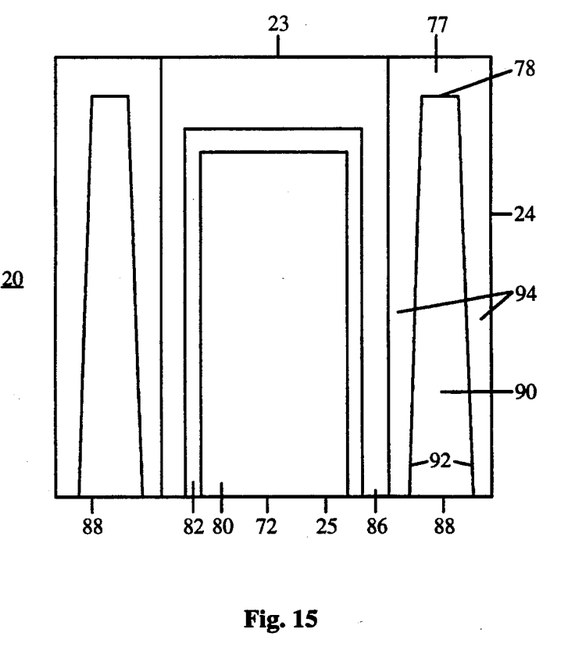
FIGS. 15-18 are top elevational views of further embodiments of a TNP slider constructed in accordance with the principles of the present invention.
Figure 16:
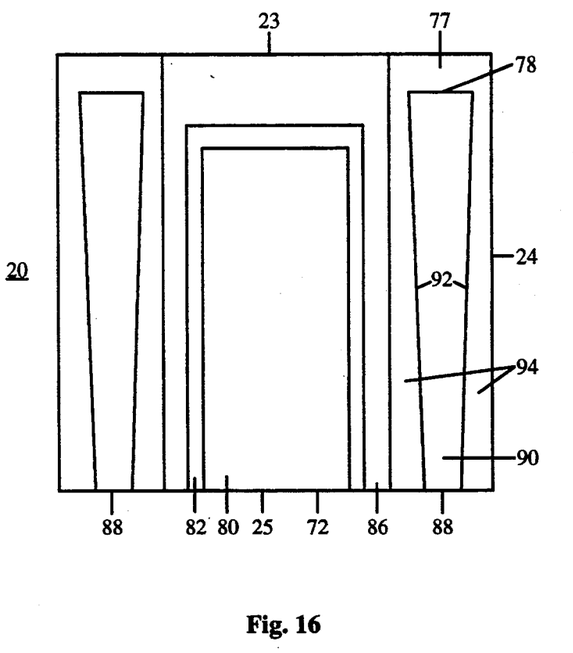
Figure 17:
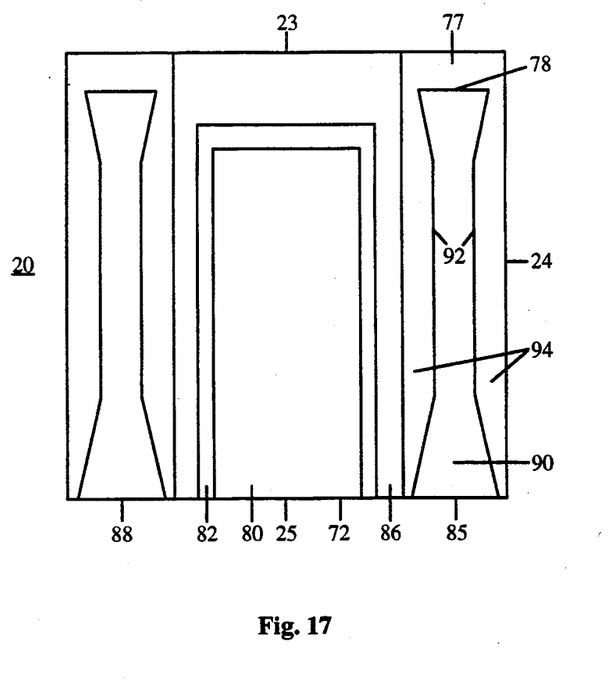

Additional geometric parameters with which to control slider take-off and flying height performance may be provided by varying either the width of the TPC contours, the width of the face, or both, in the longitudinal direction. As an example, a variation of the slider shown in FIG. 10 is presented in FIG. 15. In this embodiment, TPC rails 88 define a face 90 having non-parallel side edges 92 which diverge as the trailing edge 25 is approached. Thus TPC contours 94 have a width which decreases from leading edge 23 to trailing edge 25. In this embodiment, the increased face width at the trailing edge contributes to ease of implementation of the magnetic transducer and to increased speed of take-off of the slider from the disk surface. Another variation of the slider from FIG. 10 is presented in FIG. 16 and defines a face with side edges 92 which converge as the trailing edge is approached. In this case, the TPC contour width increases while the face width decreases from slider leading to trailing edge. In this embodiment, the decreased face width at the trailing edge contributes to decreased exposure to intermittent slider/disk contact. Additional gas bearing geometries develop when the widths of the TPC and/or face sections are described by shapes of increased complexity. Such a geometry is presented on FIG. 17. In this case, the increased face width near the slider leading and trailing edges contributes to increased gas bearing pitch stiffness. This geometry also contributes to increased ease of implementation of the magnetic transducer into the slider assembly.

Figure 18:
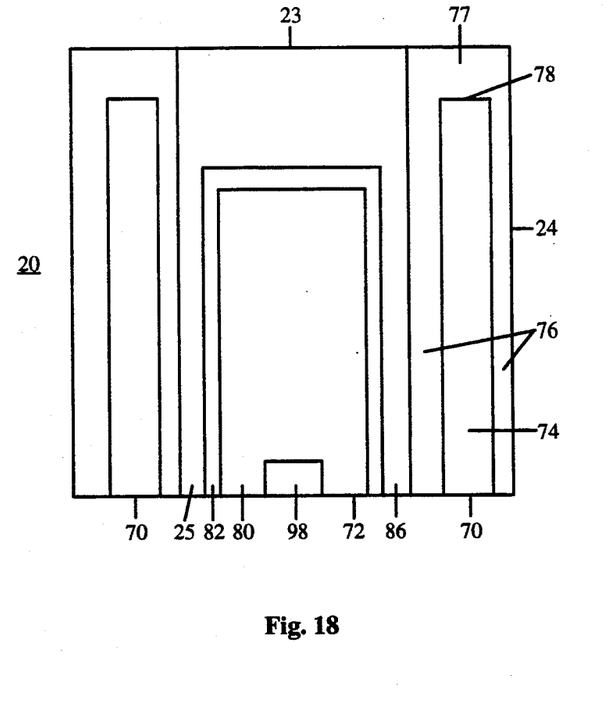

In some situations, there may be an advantage to housing the magnetic transducer (gap) in a relatively flat pad with little or no gas bearing compression inlet or TPC type edge contours. This type of pad would produce relatively little gas bearing load support. What load would be developed would result from compression due to slider pitch and/or roll orientation to the plane of the disk. This "flat gap-pad" or FGP could be positioned in a location desirable from a flying height point of view. As an example, illustrated in FIG. 18, the TNP slider 20 of FIG. 10 could be modified to contain an FGP 98 at the center of the slider trailing edge 25, within the recess region 80 of the NP pad 72. The gap flying height with the slider configuration of FIG. 18 would benefit from relative insensitivity to slider roll angle and the manufacturing tolerances which produce changes in roll angle. In this case, most of the slider positive gas bearing support would still be developed by the outer rails or pads. This arrangement provides a desired maximum gas bearing roll stiffness to the slider for stability and control of the flying height. This may be compared to the case where the "gap-pad" contour is instead configured to develop significant load support, and the gap-pad is still located near the trailing edge center of the slider, while the net applied load force to the slider remains unchanged. In such a case, the outer rails must be designed to produce less load and thus, produce a slider gas bearing with less roll stiffness. The roll stability of the slider would suffer. Although the top view of the FGP of FIG. 18 is shown to be rectangular, it may also have other shapes. For example, the FGP could have a somewhat streamlined shape front to rear, so as to minimize the accumulation of solid particles near the leading edge of the FGP which can degrade the gas bearing.

In some applications where the slider assembly starts and stops in contact with the disk surface, a more rapid take-off from the disk surface may result when the overall face of the slider air bearing surface possesses a slight amount of curvature. This curvature or "crown" as it is commonly called usually runs in the slider longitudinal direction from the leading edge 23 to the trailing edge 25, and the amount of deviation from a flat plane is typically less than $5\mu$-inches.

Shallow discontinuous portions of the gas bearing surface of the TNP slider can be formed with such processes as chemical etching, ion milling, or reactive ion etching. These processes are compatible with the requirements of high volume production. There is a general trend toward smaller, higher data storage density, higher data transfer rate information storage products. This has then caused a trend toward smaller, higher rotational speed disks and smaller recording head assemblies. There is no limitation to the applicability of the TNP gas bearing slider as sliders and disks become smaller and rotational speeds increase. The gas used with the TNP slider assembly may be air or some other gas, such as helium.

While the above is a complete description of the preferred embodiments of the invention, various alternatives and modifications and equivalents may be used. Therefore, the above description should not be taken as limiting the scope of the invention, which is defined by the appended claims.

What is claimed is:

1. A slider assembly for housing and supporting a magnetic transducer in a uniform flying height relationship with a moving magnetic recording medium, the slider assembly comprising:

a support structure having leading and trailing edges relative to the motion of said recording medium, and a longitudinal axis disposed along the length of said support structure, said longitudinal axis being at a skew angle range from zero to positive and negative values with respect to the direction of motion of said recording medium at said support structure;

at least two transverse pressurization contour (TPC) type pads carried by said support structure, with at least one said TPC type pad disposed proximate to said leading edge and at least one said TPC type pad disposed proximate to said trailing edge, each said TPC type pad defining a face toward said recording medium and having a transverse pressurization contour along at least one side edge of said face having an average angle with respect to said face of less than about 5 degrees, at least one of said TPC type pads proximate to said leading edge and at least one of said TPC type pads proximate to said trailing edge being provided with a converging portion at a leading edge of said TPC type pads for pressurizing gas between said face and said recording medium, causing said slider assembly to fly at close proximity to said recording medium during movement of said recording medium; and at least one negative pressure (NP) type pad carried by said support structure, each said NP type pad being provided with a bearing face and a recess with an open trailing edge, said recess having a depth with respect to said bearing face of less than about 25 microns, wherein said recess develops a subambient pressure level that serves to attract said slider toward said recording medium and to reduce net load of said slider;

wherein each TPC type pad is separated from each NP type pad by an ambient pressure reservoir for preventing hydrodynamic interaction between said pads, said ambient pressure reservoir defining a cavity having a depth with respect to said face of said TPC type pads sufficient to maintain substantially ambient pressure in said cavity during movement of said recording medium.

2. The slider assembly of claim 1 wherein said support structure has four of said TPC type pads and one of said NP type pads, each TPC type pad having a converging portion at a leading edge for pressurization.

3. The slider assembly of claim 2 wherein each TPC type pad is provided with a transverse pressurization contour along a second side edge of said face for providing compression in one of said contours and expansion in the second of said contours when said skew angle is non-zero.

4. The slider assembly of claim 1, wherein said support structure has four of said TPC type pads, wherein one TPC type pad is located at each of four corners of said support structure, said four corners defined by the leading edge, trailing edge, and 2 side edges of said support structure.

5. The slider assembly of claim 1, wherein said support structure has three of said TPC type pads, wherein one TPC type pad is located at each of two leading edge corners of said support structure, and one TPC type pad is located along the trailing edge of said support structure, for reducing flying height sensitivity of said TPC type pad at said trailing edge when roll effects are present.

6. The slider assembly of claim 1 wherein at least a portion of said transverse pressurization contours of said TPC type pads have non-uniform average angles.

7. The slider assembly of claim 6 wherein at least a portion of said transverse pressurization contours of said TPC type pads extend along only a portion of said side edges between said leading edge and said trailing edge, a portion of said side edges being free of said contours.

8. The slider assembly of claim 7, wherein at least one of said NP type pads defines a recess having sides which are non-parallel.

9. The slider assembly of claim 7 wherein at least one of the TPC type pads defines a face having side edges which are non-parallel.

10. The slider assembly of claim 9, wherein at least one of the NP type pads defines a recess having sides which are non-parallel.

11. The slider assembly of claim 6 wherein at least one of the TPC type pads defines a face having side edges which are non-parallel.

12. The slider assembly of claim 11, wherein at least one of the NP type pads defines a recess having sides which are non-parallel.

13. The slider assembly of claim 6, wherein at least one of said NP type pads defines a recess having sides which are non-parallel.

14. The slider assembly of claim 1 wherein at least a portion of said TPC type pads define a face having side edges which are non-parallel.

15. The slider assembly of claim 1 wherein at least one of the TPC type pads and at least one of the NP type pads defines a face having side edges which are non-parallel.

16. The slider assembly of claim 1 wherein at least one of the NP type pads defines a face having side edges which are non-parallel.

17. The slider assembly of claim 1 wherein said support structure further comprises at least one relatively flat pad with a non-converging inlet defining a face toward said recording medium, each said flat pad housing a magnetic transducer which is located near a center of the trailing edge of said support structure, so as to minimize the variation in flying height when the slider exhibits roll or roll motion.

18. The slider assembly of claim 1, wherein said faces of said TPC type pads possess a curvature from a leading edge to a trailing edge thereof, said curvature defining a deviation from a flat plane of less than about five microinches.

19. The slider assembly of claim 1, wherein said ambient pressure reservoir has a non-converging inlet along a leading edge to inhibit generation of gas bearing effects therein.

20. The slider assembly of claim 1 wherein the bearing face that surrounds leading edge and side edges of at least one of the said NP type pads does not extend to the trailing edge of said support structure.

21. A slider assembly for housing and supporting a magnetic transducer in a uniform flying height relationship with a moving magnetic recording medium, the slider assembly comprising:
a support structure having leading and trailing edges relative to the motion of said recording medium, two sides extending between said leading and trailing edges, and a longitudinal axis disposed along the length of said support structure, said longitudinal axis being at a skew angle range from zero to positive and negative values with respect to the direction of motion of said recording medium at said support structure;
first and second pair of transverse pressurization contour (TPC) type pads disposed along opposing sides of said support structure, with at least one said TPC type pad disposed proximate to said leading edge and at least one said TPC type pad disposed proximate to said trailing edge, each said TPC type pad defining a face toward said recording medium and having a transverse pressurization contour along at least one side edge of said face for providing flying height stability and control to said slider assembly during operation, said transverse pressurization contour having an average angle with respect to said face of said TPC pad of less than about 5 degrees,
at least one of said TPC pads proximate to said leading edge and at least one of said TPC type pads proximate to said trailing edge being provided with a converging portion at a leading edge of said TPC type pads for pressurizing gas between said face and said recording medium, causing said slider assembly to fly at close proximity to said recording medium during movement of said recording medium;
an negative pressure (NP) type pad carried by said support structure in a central portion thereof, said NP type pad defining a bearing face, and further having a recess with an open trailing edge, said recess having a depth with respect to said bearing face of less than about 25 microns, wherein said recess develops a subambient pressure level that serves to attract said slider toward said recording medium and to reduce net load of said slider assembly; and at least one ambient pressure reservoir separating each TPC type pad from each other TPC type pad and said NP type pad, for preventing hydrodynamic interaction therebetween, said ambient pressure reservoir defining a cavity having a depth with respect to said face of said TPC type pad sufficient to maintain substantially ambient pressure in said cavity during movement of said recording medium.

22. The slider assembly of claim 21 wherein each of said TPC type pads has a transverse pressure contour along both side edges thereof for providing compression in one of said contours and expansion in a second of said contours when said skew angle is non-zero.

23. The slider assembly of claim 22 wherein the transverse pressure contour on one side edge of said face has a different average angle than the transverse pressure contour on another side edge of said face.

24. The slider assembly of claim 21 wherein two of the said TPC type pads are disposed proximate to said leading edge and two of the said TPC type pads are disposed proximate to said trailing edge.

25. The slider assembly of claim 21 comprising a total of three TPC type pads, two of which are disposed along opposite sides of said support structure proximate to said leading edge, with the third TPC type pad disposed proximate to said trailing edge.

26. The slider assembly of claim 25 wherein said third TPC type pad is disposed centrally along said trailing edge.

27. The slider assembly of claim 21 wherein at least one of the TPC type pads defines a face having side edges which are non-parallel.

28. The slider assembly of claim 27 wherein said side edges of said face of said TPC type pad diverge from one another in a direction toward the trailing edge.

29. The slider assembly of claim 21 wherein the NP type pad defines a recess which has non-parallel sides.

30. The slider assembly of claim 21 further comprising a relatively flat pad with non-converging inlet for housing a magnetic transducer, said flat pad defining a face toward said recording medium and being disposed centrally along said trailing edge of said support structure.

31. The slider assembly of claim 21 wherein said faces of said TPC type pads possess a curvature from a leading edge to a trailing edge thereof, said curvature defining a deviation from a flat plane of less that about 5 microinches.

32. The slider assembly of claim 21 wherein the depth of said cavity of said ambient pressure reservoir is greater than about two microns.

33. The slider assembly of claim 21 wherein said transverse pressure contour comprises a step having a depth and a width, wherein $\tan^{-1}\{\text{depth/width}\} < 5°$.

34. The slider assembly of claim 21 wherein the transverse pressure contour comprises a convex surface.

35. The slider assembly of claim 21 wherein the transverse pressure contour comprises a linear taper.

36. The slider assembly of claim 21 wherein said ambient pressure reservoir has a non-converging inlet portion along said leading edge for inhibiting generation of gas bearing effects therein.

37. A slider assembly for housing and supporting a magnetic transducer in a uniform flying height relationship with a moving magnetic recording medium, the slider assembly comprising:

a support structure having leading and trailing edges relative to the motion of said recording medium, and a longitudinal axis disposed along the length of said support structure, said longitudinal axis being at a skew angle range from zero to positive and negative values with respect to the direction of motion of said recording medium at said support structure;

at least two transverse pressurization contour (TPC) type pads carried by said support structure, each said TPC type pad defining a face toward said recording medium and having a transverse pressurization contour along at least one side edge of said face having an average angle with respect to said face of less than about 5 degrees, each of the TPC type pads being provided with a stepped inlet portion for pressurizing gas between said face and said recording medium, causing said slider assembly to fly at close proximity to said recording medium during movement of said recording medium; and at least one negative pressure (NP) type pad carried by said support structure, each said NP type pad being provided with a bearing face and a recess with an open outlet edge, said recess having a depth with respect to said bearing face of less than about 25 microns, wherein said recess develops a subambient pressure level that serves to attract said slider toward said recording medium and to reduce net load of said slider;

wherein each TPC type pad is separated from each NP type pad by an ambient pressure reservoir for preventing hydrodynamic interaction between said pads, said ambient pressure reservoir defining a cavity having a depth with respect to said face of said TPC type pads sufficient to maintain substantially ambient pressure in said cavity during movement of said recording medium.

38. The slider assembly of claim 37 wherein the at least two TPC type pads include at least one TPC type pad proximate the leading edge and at least one TPC type pad proximate the trailing edge, and wherein the stepped inlet portion of at least one of the at least one TPC type pad proximate the leading edge extends longitudinally further along the support structure than does the stepped inlet portion of at least one of the TPC type pad proximate the trailing edge.

* * * * *